March 3, 1964 — E. V. CALDWELL — 3,123,378
WHEEL SUSPENSION ASSEMBLY
Filed Dec. 7, 1961 — 4 Sheets-Sheet 1

Everette V. Caldwell
INVENTOR.

March 3, 1964

E. V. CALDWELL 3,123,378

WHEEL SUSPENSION ASSEMBLY

Filed Dec. 7, 1961

Everette V. Caldwell
INVENTOR.

March 3, 1964

E. V. CALDWELL 3,123,378

WHEEL SUSPENSION ASSEMBLY

Filed Dec. 7, 1961

Everette V. Caldwell
INVENTOR.

BY Clarence A. O'Brien
and Harvey B. Jacobson
Attorneys

United States Patent Office 3,123,378
Patented Mar. 3, 1964

3,123,378
WHEEL SUSPENSION ASSEMBLY
Everette V. Caldwell, 4145 S. Norfolk, Tulsa, Okla.
Filed Dec. 7, 1961, Ser. No. 157,699
12 Claims. (Cl. 280—104.5)

The present invention generally relates to a wheel unit and more particularly to a suspension assembly for a supporting wheel which may be used on various types of boats, trailers, house trailers, water craft or any other vehicle requiring a separate wheel spring system but which enables such a vehicle to be easily transported, pulled or carried on land and upon reaching its destination, the suspension assembly may be left in a fixed position, completely removed or folded under the vehicle to which it is connected or folded over, up or out.

The primary object of the present invention is to provide a wheel suspension assembly especially adapted for but not necessarily limited to use in combination with a boat and incorporating novel structural features which enables the wheeled unit to be rapidly and expeditiously disengaged and removed from the boat.

Another object of the present invention is to provide a wheel suspension assembly which generally may be referred to as a trailing arm type and either of the single wheel or tandem wheel arrangement in which the forward end of the trailing arm is pivotally attached to a removable lower stationary frame, with the rear end portion of the trailing arm supporting a wheel unit or units and being connected with the stationary lower frame by virtue of coil spring assemblies which spring assemblies include a pressure plate reciprocal in a cylinder which pressure plate may be clamped on, welded on or threaded onto a rod which reciprocates in relation to the cylinder.

Still another object of the present invention is to provide a wheel suspension assembly for use in conjunction with a specially constructed pontoon type boat with the mounting structure including the lower support frame being disposed between longitudinally spaced pontoons.

A further important feature of the present invention is to provide a wheel suspension assembly in which the lower stationary supporting frame is of substantially U-shaped configuration with the upturned ends thereof detachably mounted in downwardly opening sockets rigidly affixed to the boat or other object to which the wheel suspension assembly is attached.

Another very important feature of the present invention is the provision of a wheel suspension assembly including a stationary lower frame member having a spring biased lock assembly for releasably securing the lower stationary support frame to socket-type brackets attached to the boat or the like.

It is another object of the present invention to provide a wheel suspension assembly having many variations and modifications by virtue of which the assembly may be constructed in a variety of configurations while retaining structural features for accomplishing the aforementioned objects.

One additional object of the present invention is to provide a wheel suspension assembly which is quite simple in construction, easy to attach and detach, effective for spring supporting a boat, trailer, house trailer or the like, rugged and long lasting, trouble free in operation and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
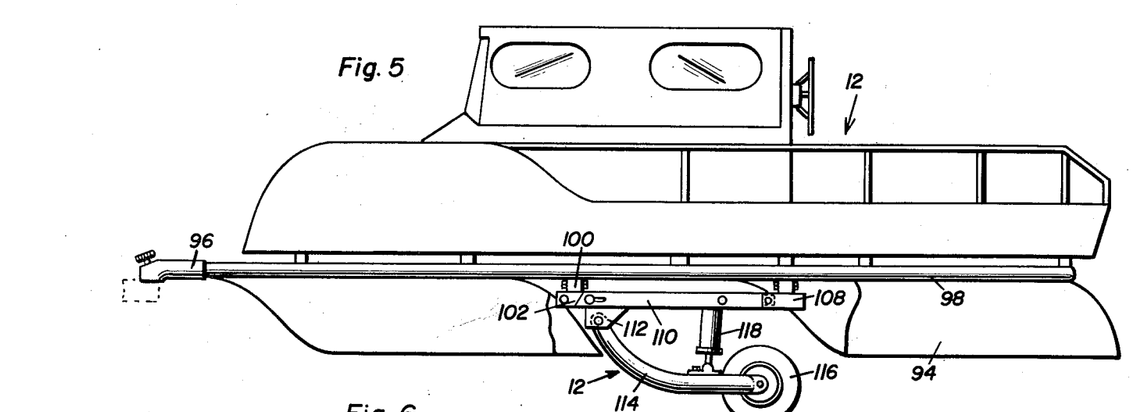
FIGURE 5 is a side elevational view, with portions broken away, of a pontoon type boat having a modified form of the wheel suspension assembly of the present invention incorporated therein.
Figure 6:
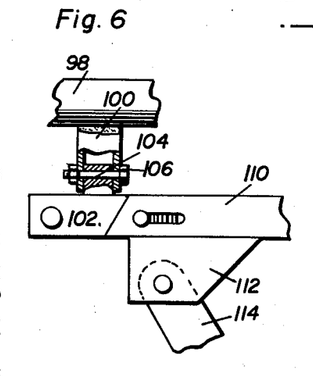
FIGURE 6 is a fragmentary enlarged elevational view, with portions shown in section, illustrating the forward portion of the lower stationary frame and the manner in which it is attached to the boat.

Referring now specifically to FIGURES 1-4 of the drawings, the numeral 10 generally designates the wheel suspension assembly as illustrated in this embodiment. In FIGURES 5 and 6, the numeral 12 generally designates another form of wheel suspension assembly and numeral 14 generally designates the form of the invention illustrated in FIGURES 8-11 while numeral 16 generally designates the form of the invention illustrated in FIGURES 12 and 13.

Figures 1, 2, 3, 4:
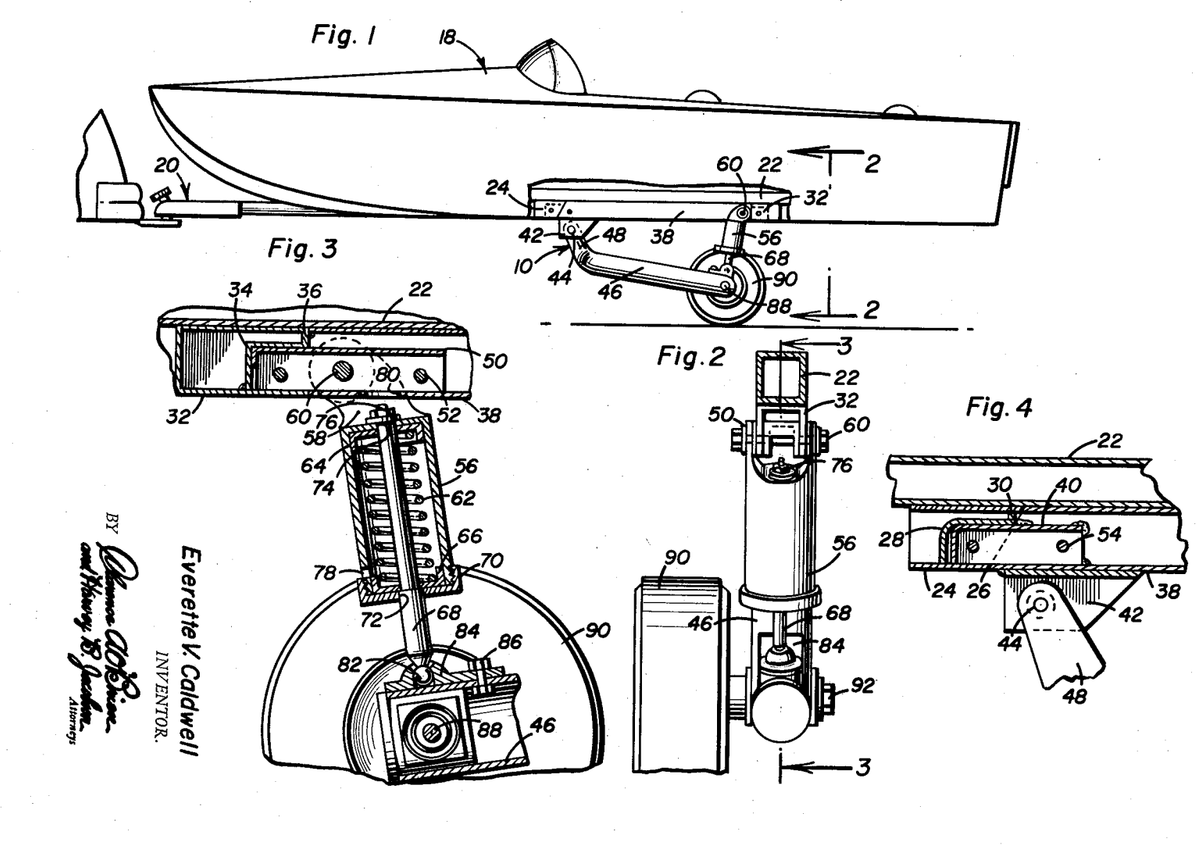
FIGURE 1 is a side elevational view of a boat having one embodiment of the wheel suspension assembly incorporated therein.
FIGURE 2 is a vertical sectional view taken substantially upon a plane passing along section line 2—2 of FIGURE 1 illustrating the relationship of the component parts of the assembly.
FIGURE 3 is a vertical sectional view taken substantially upon a plane passing along section line 3—3 of FIGURE 2 illustrating the construction of the spring support and the manner of attachment thereof to the trailing arm of the suspension assembly and the stationary lower frame member.
FIGURE 4 is a detailed sectional view illustrating the structure and relationship of the components of the forward end portion of the stationary frame and the manner of attaching the trailing arm thereto.

Referring now specifically to FIGURES 1-4 of the drawings, the wheel suspension assembly of the present invention is illustrated in use in combination with a boat structure generally designated by numeral 18 which may be of any suitable construction and provided with a tongue and hitch assembly generally designated by numeral 20 extending from the bow in a suitable manner. The tongue and hitch assembly 20 may be removable so that the boat may be used in the usual manner without interference from the tongue. The wheel suspension assembly 10 is mounted at a convenient location adjacent each side edge of the boat and adjacent the center thereof so that the boat 18 will be adequately supported. The boat hull structure is provided with a longitudinally elongated support rail or frame member 22 which forms a part of the boat hull structure and is attached thereto in any suitable manner. The frame member 22 may be of a hollow box construction as illustrated in FIGURE 2 or of any other suitable structural shape with there normally being provided two of the frame members 22.

At the forward end of the frame member 22 there is provided a depending bracket 24 preferably of box construction and having an inclined edge 26 facing rearwardly thus defining a longitudinally opening socket or pocket. A substantially L-shaped partition member 28 is connected to the bottom of the bracket 24 and extends upwardly and then horizontally rearwardly to a point adjacent the inclined edge 26 and is then connected with the top of the bracket 24 by a short connecting member 30. Thus, the partition 28 which extends between the side walls of the bracket 24 cooperates with the bottom portion of the bracket 24 to form a rearwardly opening pocket or socket in the bracket 24.

The rear end portion of the frame 22 is provided with a depending bracket 32 of box construction rigidly affixed to the frame member 22 in any suitable manner. An L-shaped partition member 34 extends between the side walls of the bracket 32 and extends upwardly from the bottom of the bracket 32 and then forwardly to the front end of the bracket 32 where it is connected thereto by a connecting member 36 thus defining a forwardly and downwardly opening pocket in the bracket 32.

Mounted between the brackets 24 and 32 is a longitudinally elongated lower stationary supporting frame 38 which is of hollow box construction and which has an inverted channel-shaped extension 40 welded to the interior surface of the frame 38 at the forward end thereof which extends into the socket defined by the bottom of the bracket 24 and the L-shaped partition 28 thus interconnecting the front end of the frame 38 with the bracket 24. The forward end of the frame 38 is also provided with a pair of depending lugs 42 which may be in the form of legs of an inverted U-shaped member secured to the frame 38 by suitable welding or the like. The lugs 42 receive a pivot mounting pin or bolt 44 at the forward end of an elongated trailing support arm 46 which has an upwardly inclined forward end portion 48 pivotally received between the lugs 42 whereby the trailing support arm 46 may swing in substantially a vertical plane about an axis defined by the pivot bolt 44.

The rear end of the frame 38 has an inverted longitudinal channel-shaped extension 50 projecting longitudinally beyond the end thereof for reception in the socket defined by the L-shaped member 34. Fastening bolts, rivets or the like are designated by numeral 52 and are employed for securing the extension 52, the frame 38 and similar fasteners 54 are employed for securing the front extension 40 to the frame 38.

Pivotally attached to the lower support stationary frame 38 adjacent the rear thereof is a cylinder 56 having a pair of upstanding lugs or ears 58 rigid therewith which receive there-between the lower stationary support frame 38. A pivot bolt or pin 60 interconnects the ears 58 and the lower stationary support frame 38 and enables the cylinder 56 to oscillate in substantially a vertical plane in a manner described hereinafter.

Disposed within the cylinder 56 is a coil compression spring 62 having one end thereof abutting the upper end of the cylinder 56 or an insert 64 placed therein. The other end of the spring 62 engages a pressure plate 66 which may be considered in the nature of an abutment which will cause compression of the spring 52 if the pressure plate 66 is moved toward the top of the cylinder 56. An elongated rod 68 is disposed centrally of the spring 62 and has a pressure plate 66 rigidly secured thereto as by clamping, threaded engagement or welding so that upon longitudinal movement of the rod 68 in relation to the cylinder 56, the spring 62 will be compressed or expanded to its full extent within the confines of the cylinder 56. A closure cap 70 is provided for the lower end of the cylinder 56 and the cap 70 has a central aperture 72 slidably receiving the rod 68. The cap 70 forms a retainer for the spring 62 and also a retainer for the pressure plate 66 so that the structure will be retained in assembled condition. The upper end of the rod 68 also extends through an opening 74 in the top end of the cylinder 56 and a retaining nut 76 is provided on the upper end of the rod 68 to limit the downward movement thereof inasmuch as the nut 76 or a washer placed thereunder will engage the upper end of the cylinder 56 thereby limiting the movement of the rod 68 so that it will not become disengaged with the pressure plate 66 in the event only a shoulder is used to engage the pressure plate 66 as is illustrated in FIGURE 3. The bottom portion of the cylinder 56 is provided with a drain opening 78 to prevent collection of water or other foreign material in the interior of the cylinder 56. The piston or pressure plate does not have any pneumatic or hydraulic cushioning forces exerted thereon with the sole resistance to inward movement of the rod 68 being the force exerted by the compression spring 62. In order to employ the least space and vertical height, the bottom of the frame 68 as well as the extension 50 may be provided with apertures 80 for permitting upward movement of the rod 68. In lieu of this, the orientation of the rod, cylinder and other related mechanism may be such that the rod will not come into contact with the lower stationary frame 38. The lower end of the rod 68 is provided with spherical ball 82 received in a socket member 84 that is attached to the upper surface of the trailing arm 46 by virtue of a fastening bolt 86, welding or the like. A spindle shaft 88 extends across the rear end of the trailing arm 46 and forms a support for a ground engaging wheel 90. Suitable bearings of a conventional nature are provided for rotatably journaling the supporting wheel 90 on the spindle shaft 88 and a suitable retaining nut or similar mechanism 92 may be provided for retaining the spindle shaft 88 mounted transversely of the trailing arm 46.

Thus, with the construction of this form of the invention, a single, tandem or dual wheel assembly may be supported from the rear end portion of the trailing arm 46 by virtue of the resistance to upward movement of the rear end of the trailing arm 46 by the spring 62. If desired, a suitable adjustment may be provided for varying the tension necessary to compress the spring depending upon the loads to be carried by the device and, the removal of a very few fastener elements enables the lower support bar or frame 38 to be easily removed thereby enabling the boat to be used in a conventional manner after it has been transported to a desired location.

Figure 7:
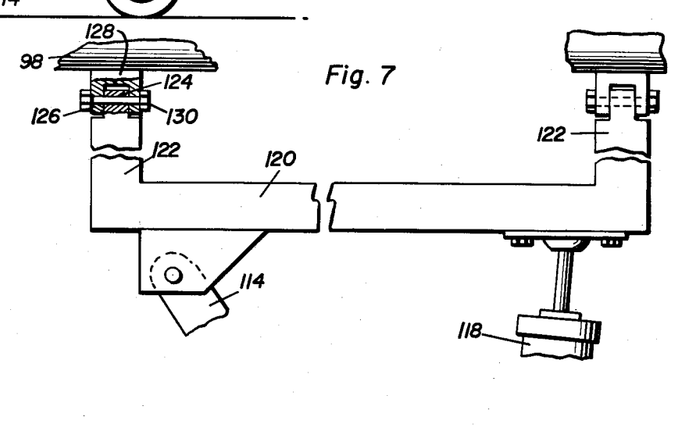
FIGURE 7 is a fragmentary elevational view with portions shown in section illustrating the modified form of the lower support frame in which the frame is substantially U-shaped in configuration.

Referring now specifically to FIGURES 5–7 of the drawings, the wheel suspension assembly 12 is mounted on a novel type of boat 92 having longitudinally spaced pontoons 94 mounted thereon in any suitable manner. A forwardly extending hitch assembly 96 is provided for attachment to a suitable towing vehicle. The hitch assembly 96 is connected with a portion of the boat frame 98 to which the wheel suspension assemblies 12 are connected.

The wheel suspension assembly includes a depending tubular attaching bracket 100 at the forward end and rear end of the wheel suspension assembly with the bracket 100 being affixed to the frame member 98 by any suitable means such as welding or the like. A forward bracket 102 is detachably connected to the forward supporting or attaching bracket 100 by virtue of having an upstanding member 104 telescopically received within the tubular bracket 100 and being secured thereto by a removable bolt, pin or the like 106. The bracket construction 102 is thus detachably engaged with the supporting frame 98. The rear bracket for the wheel suspension assembly is slightly different from the forward bracket and is designated by numeral 108. The brackets 102 and 108 form sockets for receiving a lower stationary supporting frame member 110 which is slightly different from the arrangement disclosed in FIGURES 1–4 and will be described in detail in conjunction with FIGURES 8–11. The lower stationary support frame 110 is provided with a depending bracket 112 at the forward end thereof which pivotally supports a trailing support arm 114 in substantially the same manner as the support arm 46 is supported from the bracket 42. A supporting wheel 116 is journaled on a spindle at the rear of the trailing support arm 114 and a spring assembly 118 is connected between the trailing support arm 114 and the lower stationary support frame 110 at a point forwardly of the wheel 116. The spring assembly 118 is the same as that disclosed in FIGURES 1–4 except that the bracket structure 84 is reversed and the ears 58 are reversed in that they curve rearwardly as illustrated in FIGURE 5.

In this form of the invention, the lower stationary support frame 110 may be removed in a manner described hereinafter or the brackets 102 and 108 may be removed if desired.

FIGURE 7 illustrates a modified form of lower stationary support frame designated by numeral 120 which is of integral construction and of generally U-shaped construction and provided with upstanding end portions 122. The end portions 122 terminate at their upper ends in upstanding lugs 124 received between depending ears 126 on an attaching bracket 128 attached rigidly to the boat frame 98. Pivot bolts 130 extend through apertures in the ears 126 and in the lug 124 thereby pivotally as well as detachably connecting the lower support stationary frame 120. In this construction, the spring assembly 118 has been illustrated in inverted position to illustrate that the spring assembly may be installed either with the cylinder uppermost or with the cylinder disposed at the lower point thereof and attached to the trailing support arm 114.

Referring now specifically to FIGURES 8–11, the wheel suspension assembly 14 is supported from a trailer frame element 132 and brackets 134 and 136 are rigidly affixed thereto in any suitable manner. The brackets 134 and 136 are in the form of hinges having the lower strap 138 attached to a box-type bracket with the forward box-type bracket being designated by numeral 140 and the rear box-type bracket being designated by numeral 142. The forward box-type bracket 140 is provided with an inclined rear edge 144 and includes a reinforcing plate 146 thus defining a rearwardly opening socket. The rear bracket 142 defines a forwardly opening socket for purposes of cooperation with the forward bracket 140 to receive a lower stationary support frame 148 which is substantially the same as the support frame 110 and includes an elongated hollow box member having a plug 150 at the rear end thereof with the plug 150 being secured in position by welding, fastening bolts or the like and the outer end of the plug 150 extends beyond the frame 148 in the form of a frusto-pyramidal extension 152 having an aperture 154 extending therethrough. The extension 152 is received within the rear bracket 142 and is held in position therein by a transverse bolt or pin 156.

Figure 8:
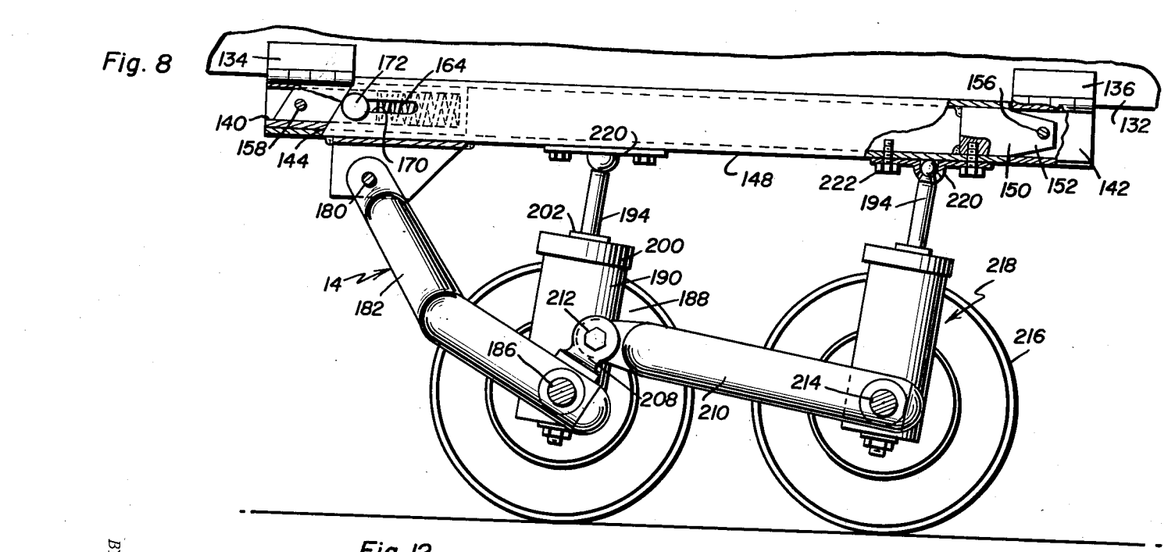
FIGURE 8 is a detailed side elevational view, with portions shown in section, of another form of wheel suspension assembly including a tandem wheel arrangement and a spring lock assembly for retaining the lower stationary frame interlocked with the supporting bracket.
Figure 11:
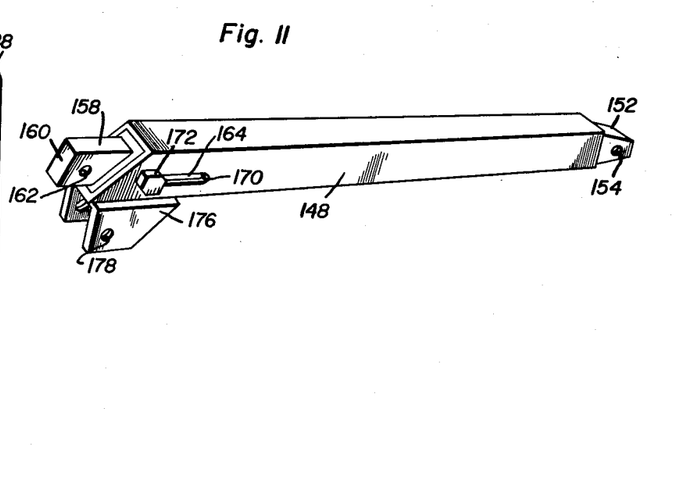
FIGURE 11 is a perspective view of the spring lock type of lower stationary frame.

The forward end of the lower stationary support frame 148 is provided with an extension 158 which is longitudinally slidably disposed within the interior of the stationary frame 148. The free end of the extension 158 is inclined as at 160 and provided with an opening 162. A coil compression spring 164 is disposed behind the extension 158 and engages the inner end thereof with the other end of the spring 164 being in engagement with a transverse abutment 166 rigidly affixed to the support frame 148 by welding or the like as designated at numeral 168.

The support frame 148 is provided with a longitudinal slot 170 in each side thereof receiving a fastening bolt or pin 172 which extends through the extension 158. The bolt 172 is slidably disposed in the slot 140 so that by loosening the bolt and urging it rearwardly, the extension 158 may be retracted thus disengaging the extension 158 from the front bracket 140. Of course, a bolt 174 extending through the aperture 162 and the bracket 140 must be initially removed before the extension 158 can be retracted. Thus, by removing the bolts 174 and 156, the extension 158 may be retracted and locked in retracted position by virtue of again tightening the bolt 172 and the lower stationary support frame 148 may then be easily disconnected from the brackets 140 and 142. After disconnection or before disconnection, the wheel suspension assembly 14 may be pivoted to an inoperative position upwardly alongside of the framework 132 by pivoting the brackets and support frame 148 about the hinge axis defined by the hinge brackets 136.

Figure 10:
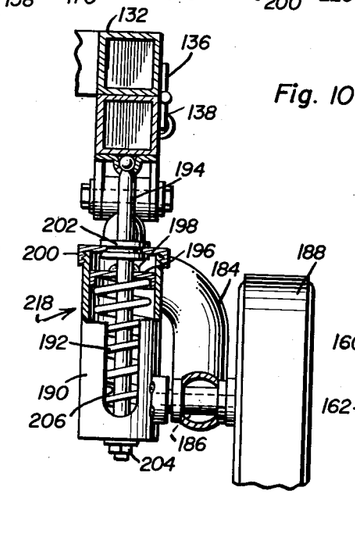
FIGURE 10 is a vertical sectional view taken substantially upon a plane passing along section line 10—10 of FIGURE 9 illustrating the particular construction of the spring support.

At the forward end of the lower stationary support frame 148, there is provided an inverted U-shaped bracket 176 similar to the bracket 112 and including apertures 178 therein for receiving a pivot pin or bolt 180 which supports a trailing support arm 182. The trailing support arm 182 is provided with a laterally offset rearwardly extending portion 184 through which extends a supporting spindle 186 for a support wheel 188 which is journaled thereon in any suitable manner. The spindle 186 is also rigidly affixed to the bottom end of a spring cylinder 190 in any suitable manner such as welding or the like. Disposed in the spring cylinder 190 is a coil compression spring 192 and a spring biased rod 194 having a pressure plate 196 rigidly affixed thereto as by welding 198, whereby downward movement of the rod 194 will compress the spring 192 in an obvious manner. The upper end of the cylinder 190 is closed with a closure cap 200 and the rod 194 extends therethrough and is received in a bearing grommet or suitable adapter 202 for guiding the movement of the rod 194. The rod 194 extends through the bottom of the cylinder 190 and is provided with a retaining nut 204 thereon to limit the upward movement of the rod 194 so that the pressure plate 196 will not engage the grommet or adapter 202. The cylinder 190 is also provided with an elongated and enlarged slot 206 to enable any water, dirt or other foreign material to be discharged from the interior of the cylinder inasmuch as the device will be subject to water, dirt and the like being thrown therein during over the road movement and also water may enter this portion of the structure when the boat is launched into the water from a launching ramp or the like.

Figure 9:
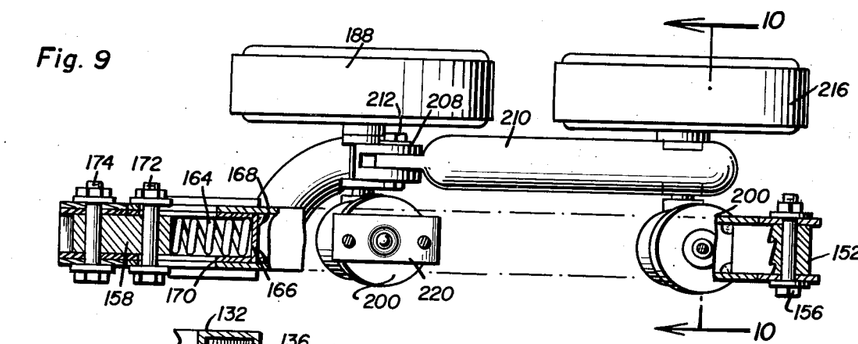
FIGURE 9 is a top plan view of the assembly of FIGURE 8 with portions thereof shown in section.

This assembly is a tandem wheel assembly and for this purpose, the rear end of the trailing support arm 182 is provided with a pair of upstanding bracket lugs or ears 208 which are disposed above the spindle 186 and which receives the forward end of a rear trailing arm 210 therebetween. A pivot bolt 212 pivotally attaches the rear trailing arm 210 to the lugs 208 and the rear trailing arm 210 is straight and provided with a support spindle 214 at the rear end thereof which has a supporting wheel 216 journaled on one end thereof and which has the other end rigidly affixed to a spring assembly generally designated by numeral 218 which is the same as the assembly discussed in detail in conjunction with the forward trailing arm 182. In each instance, the upper end of the rod 194 is connected to the stationary frame 148 by a bracket 220 having a ball and socket connection with the upper end of the rod 194 and being secured to the lower stationary support frame 148 by fastening bolts 222 or other suitable securing means. With this assembly, a tandem wheel suspension unit is provided and this wheel suspension unit may be used in lieu of the single wheel suspension unit shown in the other forms of the invention. Also, in each instance, a dual or multiple wheel assembly may be employed in lieu of the single wheel and the lower support frame 148 may be used with any type of wheel suspension assembly disclosed herein. In other words, the particular type of lower stationary support frame may be varied, the particular means of attaching the brackets or the lower support frame to the boat or framework of a trailer may be varied and the particular type of wheel assembly may be varied thus providing several variations so that by using selective of the variations disclosed, the most desirable and efficient wheel suspension assembly may be provided.

Figure 12:
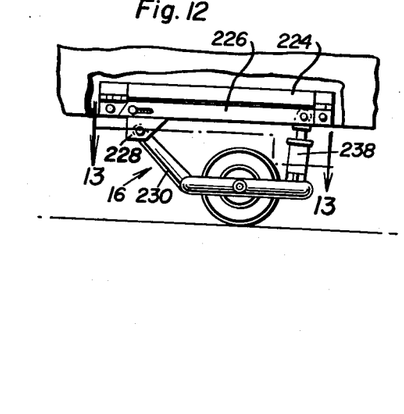
FIGURE 12 is a fragmentary side elevational view of another form of wheel suspension assembly in which the supporting wheel is disposed in a horizontal loop formed in the rear of the trailing arm support.
Figure 13:
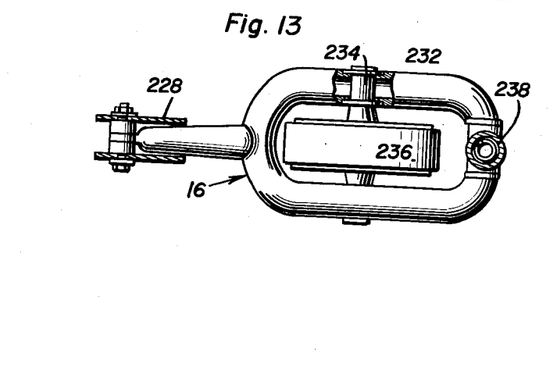
FIGURE 13 is a plan, sectional view taken substantially upon a plane passing along section line 13—13 of FIGURE 12 illustrating the relationship of the components of this embodiment of the invention.

FIGURES 12 and 13 illustrate another form of the invention in which the support framework 224 is the same as the frame member 132, the lower stationary support frame 226 is substantially the same as the support frame 148 and attached to the end brackets in the same manner. In this form of the invention, a single U-shaped bracket 228 is provided and pivotally attached thereto is a trailing support arm 230 which terminates in a horizontally disposed generally rectangular loop 232 having both ends of an axle or spindle 234 mounted therein whereby the axle or spindle journals a single supporting wheel 236 within the loop. Of course, a dual or multiple wheel assembly may be provided therein. The rear end of the loop 232 is supported from the rear end of the support frame 226 by a spring assembly 238 equivalent to or identical to the spring assemblies employed in FIGURE 8 or the spring assembly employed in FIGURE 5 or in FIGURE 1. A tandem assembly may be provided by adding a second trailing suspension arm to this construction and the spring suspension assembly may be modified in the same manner by using a multiple of either type of spring assembly in which the movement of the rod is either upward or downward depending upon the manner of installation of the device.

The various attaching brackets and supporting frame members may be laterally adjustably mounted on the boat structure or on the trailer structure to orientate the supporting wheels in the best possible position in relation to the trailer frame. Also, the length of movement and the orientation of the spring assemblies may be varied depending upon the particular loads to be carried by the various supporting assemblies. The various components which are connected together may be permanently connected as by welding or the like or may be screw threaded together or otherwise connected in such a manner that the components may be taken apart and interchanged with new components especially where wear occurs. Further, all pivotal connections may be provided with suitable lubrication facilities, antifriction bearing means and the like as desired. For example, any suitable bearing construction may be provided for supporting the wheels with either the spindles or axles being journaled in the trailing supporting arms or the wheels may be journaled on the axles by using conventional ball bearing, roller bearing or bushing type bearing assemblies.

The various frame components may be constructed of hollow configuration for rigidity and lightweight and may be of any suitable size, shape and configuration depending upon the necessities for each particular installation.

The orientation of the spring assemblies may be varied as to their points of connection with the trailing arm assemblies and the stationary lower supporting frame and also, the structure may be modified in any suitable manner to enable the desired movement of the components of the spring assembly. The fact that the rod extends completely through the cylinder provides for stability of the rod since it has a bearing point at both the top and bottom of the cylinder. The manner of connecting the pressure plate to the rod may be varied as long as there is a rigid connection and the pressure plate is smaller than the interior dimensions of the cylinder so that the cylinder will only serve as a guide for the pressure plate and the pressure plate will not act as a piston within the cylinder and there is no cushioning from any pneumatic or hydraulic action.

All of the various retaining bolts which are removable may be provided with a plastic covered chain or cable that is secured to a stationary part of the frame in order to prevent loss of the bolts. Also, the bolts may be in the form of pins having pivotal lock elements on one thereof which may be pivoted to a transverse position after insertion through the aligned apertures.

As will be apparent, the various units of the present invention may be installed in any suitable position and in any suitable manner with the wheel assembly being capable of easy removal or being capable of permanent attachment of a vehicle structure. The assembly may be used in conjunction with boats, various types of trailers including house trailers and the like or any type of vehicle requiring a plurality of wheel suspension assemblies for support thereof during transport over the road or ground surface. Normally, two wheel suspension assemblies would be adequate for supporting most trailers. However, the present invention also encompasses the possibility that more than two wheel assemblies may be employed. In fact, the device may be employed in conjunction with a trailer having four wheel assemblies in which event the forward wheel assemblies may be mounted in such a manner that they can caster for steerability or they may be connected with steering control means for pivoting the front wheels for steering control of a trailer type of vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel suspension assembly for use in combination with boats, trailers or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member.

2. A wheel suspension assembly for use in combination with boats, trailer or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed fame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said projections being rigidly affixed to the lower stationary frame and at least one of said sockets formed by the brackets opening downwardly for enabling removal of the lower stationary frame.

3. A wheel suspension assembly for use in combination with boats, trailer or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said projections including one being longitudinally adjustably mounted on the lower stationary frame, spring means urging the projection longitudinally outwardly of the lower stationary frame, handle means for said projection thereby enabling retraction of the projection, the sockets defined by said brackets opening longitudinally towards each other whereby retraction of the projection will enable the lower stationary frame to be detached from and connected with the rigidly affixed frame member.

4. A wheel suspension assembly for use in combination with boats, trailer or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said lower stationary frame being of substantially U-shaped configuration and provided with upturned end portions forming the projections, said sockets defined by the brackets opening downwardly for telescopically receiving the upturned end portions of the lower stationary frame, and removable fastener means extending through the brackets and upstanding ends of the lower stationary frame thereby detachably securing the lower stationary frame to the rigidly affixed frame member.

5. A wheel suspension assembly for use in combination with boats, trailer or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member, resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said brackets being hingedly attached to the rigidly affixed frame member whereby the brackets may be pivoted to a retracted position with the lower stationary frame attached thereto or after the lower stationary frame has been detached therefrom thereby enabling the wheel suspension assembly to be pivoted to an inoperative position when desired.

6. A wheel suspension assembly for use in combination with boats, trailer or other mobile vehicular structures comprising a longitudinal extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said trailing arm being provided with an offset portion between the front and rear end portions thereof whereby the wheel means may be disposed directly under the lower stationary frame.

7. A wheel suspension assembly for use in combination with boats, trailer or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said spring means including a cylindrical member, a coil spring disposed in the cylindrical member with one end of the coil spring engaging one end of the cylinder, a pressure plate engaging the other end of the coil spring, a rod rigidly affixed to the pressure plate for compressing the spring upon movement of the pressure plate and rod towards the end of the cylinder which abuts the coil spring, said rod and cylinder extending between the trailing arm and lower stationary frame and being pivotally connected therebetween.

8. The structure as defined in claim 7 wherein said rod extends through both ends of the cylinder, a retaining member on one end of the rod for limiting the outward movement thereof in relation to the cylinder, said cylinder having vent means extending into the interior thereof to enable drainage of water or the like therefrom.

9. A wheel suspension assembly for use in combination with boats, trailer or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said trailing arm including a loop-shaped rear end portion, said wheel means being journaled between the side portions of the loop-shaped rear end portion of the trailing arm and being in alignment with the lower stationary frame.

10. A wheel suspension assembly for use in combination with boats, trailer or other mobile vehicular structures comprising a longitudinally extending frame member rigidly affixed in relation to the vehicle to be transported, a longitudinally extending lower stationary frame disposed in underlying relation to the rigidly affixed frame member, means detachably connecting the lower stationary frame to the rigidly affixed frame member, a trailing support arm underlying said lower stationary frame, means pivotally connecting the forward end of the trailing support arm to the lower stationary frame, wheel means rotatably supported by the rear end portion of the trailing arm for engaging the ground surface, and spring assembly means extending between the lower stationary frame and the rear end portion of the trailing arm whereby to support the lower stationary frame resiliently from the wheel means for supporting the rigidly affixed frame member resiliently thereby enabling the lower stationary frame, the trailing arm, the wheel means and spring assembly means to be removed from the structure being transported when a desired destination has been reached, said lower stationary frame being in the form of a longitudinally elongated member having a projection on each end, said means connecting the lower stationary frame to the rigidly affixed frame member including a depending bracket on said frame member adjacent each end of said lower stationary frame and including sockets receiving the projections on the lower stationary frame, and retaining members interconnecting the sockets and projections thereby removably securing the lower stationary frame to the rigidly affixed frame member, said trailing arm including an upstanding bracket adjacent the rear end portion thereof, a second trailing arm pivotally attached to the first trailing arm, wheel means mounted on the rear end of the second trailing arm, and spring assembly means extending between the rear end portion of the second trailing arm and the lower stationary frame thereby forming a removable tandem wheel assembly.

11. In a removable wheel assembly for detachable supporting engagement with a vehicle having depending brackets with longitudinally facing sockets, that improvement comprising an elongated lower stationary frame, an extension of reduced transverse dimensions on one end of the lower stationary frame for telescopic engagement in one of said sockets, an extension slidably mounted on the other end of the lower stationary frame and being of less cross-sectional dimension for reception in the other socket, spring means engaging the slidable extension for resiliently urging the extension to extended position, handle means on the extension for retracting the extension against the spring thereby enabling detachment of an assembly of the lower stationary frame in relation to the brackets.

12. The structure as defined in claim 11 wherein said handle is in the form of a fastening bolt extending through a slot in the lower stationary frame whereby tightening of the bolt will lock the slidable extension in adjusted position.

References Cited in the file of this patent

UNITED STATES PATENTS

| | | |
|---|---|---|
| 2,457,395 | Owens | Dec. 28, 1948 |
| 2,516,574 | Holly | July 25, 1950 |
| 2,588,084 | Bushfield | Mar. 4, 1952 |
| 2,781,529 | Moody | Feb. 19, 1957 |
| 2,788,908 | Lynd | Apr. 16, 1957 |
| 3,025,537 | Rasmussen | Mar. 20, 1962 |